United States Patent [19]
Ganthier et al.

[11] Patent Number: 6,081,422
[45] Date of Patent: Jun. 27, 2000

[54] UNIVERSAL MOUNT FOR COMPUTER PERIPHERAL DEVICE

[75] Inventors: James Ganthier; Troy A. Della Fiora; Kevin Mundt, all of Spring, Tex.; William Dorr, Phoenix, Ariz.

[73] Assignee: Compaq Computer Corporation, Houston, Tex.

[21] Appl. No.: 08/914,858

[22] Filed: Aug. 19, 1997

[51] Int. Cl.[7] .................................. G06F 1/16; H04N 7/14
[52] U.S. Cl. ........................... 361/686; D14/106; 348/14; 348/552
[58] Field of Search ................................. 361/686, 683, 361/687; D14/106; D16/200, 206; 348/12, 14, 15, 16, 20, 552

[56] References Cited

U.S. PATENT DOCUMENTS

| | | | |
|---|---|---|---|
| D. 363,471 | 10/1995 | Shima et al. ............................. | D14/106 |
| 4,744,005 | 5/1988 | Milani ...................................... | 361/687 |
| 5,581,299 | 12/1996 | Raney ...................................... | 348/552 |
| 5,612,733 | 3/1997 | Flohr ........................................ | 348/14 |
| 5,666,153 | 9/1997 | Copeland ................................. | 348/15 |
| 5,719,799 | 2/1998 | Isashi ...................................... | 348/552 |
| 5,734,414 | 3/1998 | Nishimura et al. ....................... | 348/14 |
| 5,748,441 | 5/1998 | Loritz et al. ............................. | 361/683 |
| 5,768,163 | 6/1998 | Smith, II .................................. | 361/686 |
| 5,793,367 | 8/1998 | Taguchi .................................... | 348/15 |
| 5,801,919 | 9/1998 | Griencewic .............................. | 361/683 |
| 5,806,672 | 9/1998 | Wakabayashi et al. ................. | 348/552 |
| 5,828,779 | 10/1998 | Maggioni ................................. | 382/165 |
| 5,828,986 | 10/1998 | Horigome et al. ....................... | 348/552 |

*Primary Examiner*—Leo P. Picard
*Assistant Examiner*—Lisa Lea-Edmonds
*Attorney, Agent, or Firm*—Conley, Rose & Tayon, P.C.; Michael F. Heim; Jonathan M. Harris

[57] ABSTRACT

A computer system including a monitor which mechanically and electrically receives a peripheral device such as a camera. A top surface of the monitor includes a recessed portion into which the peripheral device mounts. A pair of tabs in the recessed portion engage recesses in the peripheral device securely affixing the peripheral device to the monitor. The monitor also includes an electrical connector that automatically mates with a connector on the peripheral device when the peripheral device is mounted in the recessed portion of the monitor, thereby establishing electrical connectivity between the peripheral device and the computer system. The mounting arrangement securely affixes the peripheral device and obviates the need for the user to connect the peripheral device to the computer by way of an external cable.

22 Claims, 7 Drawing Sheets

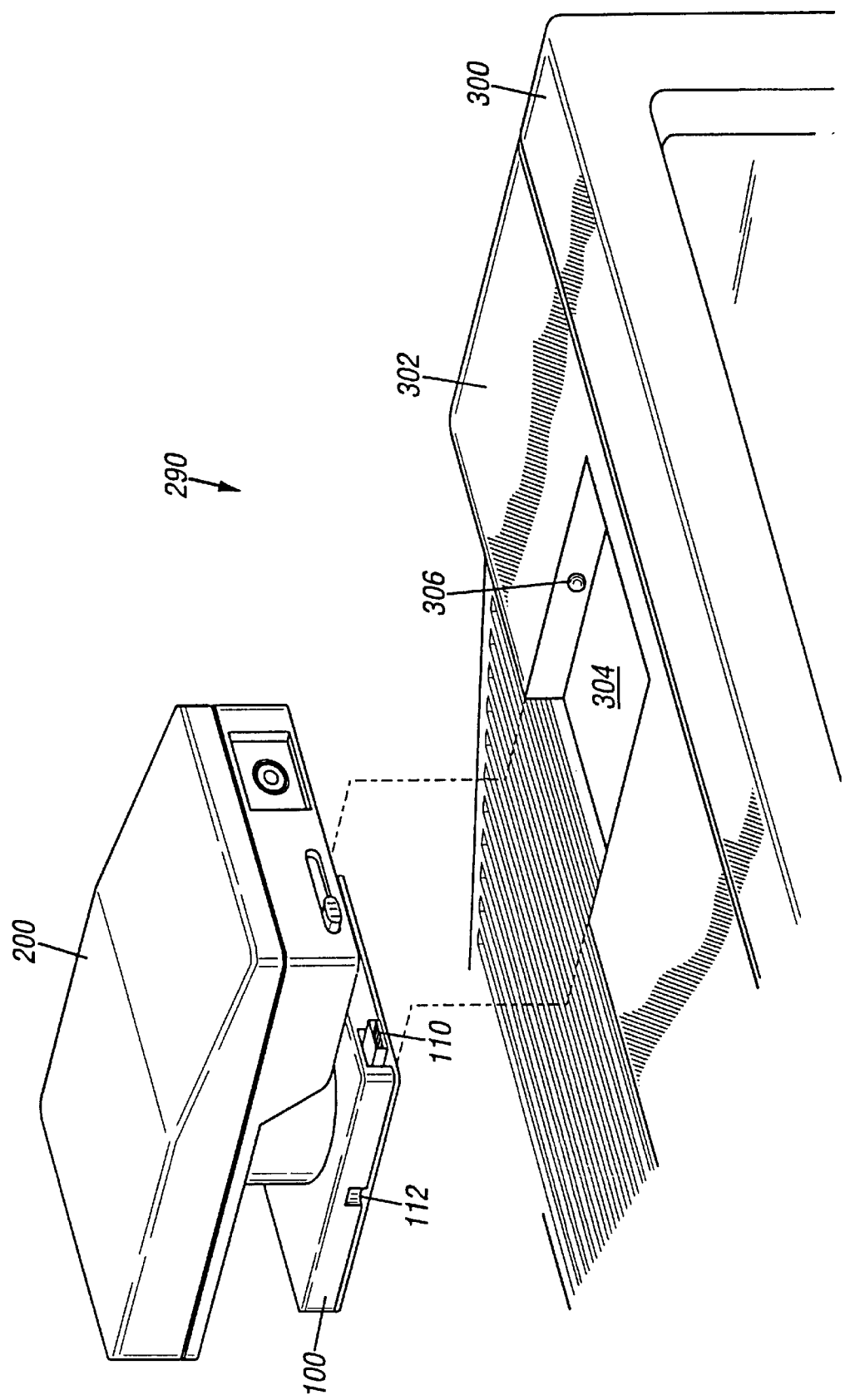

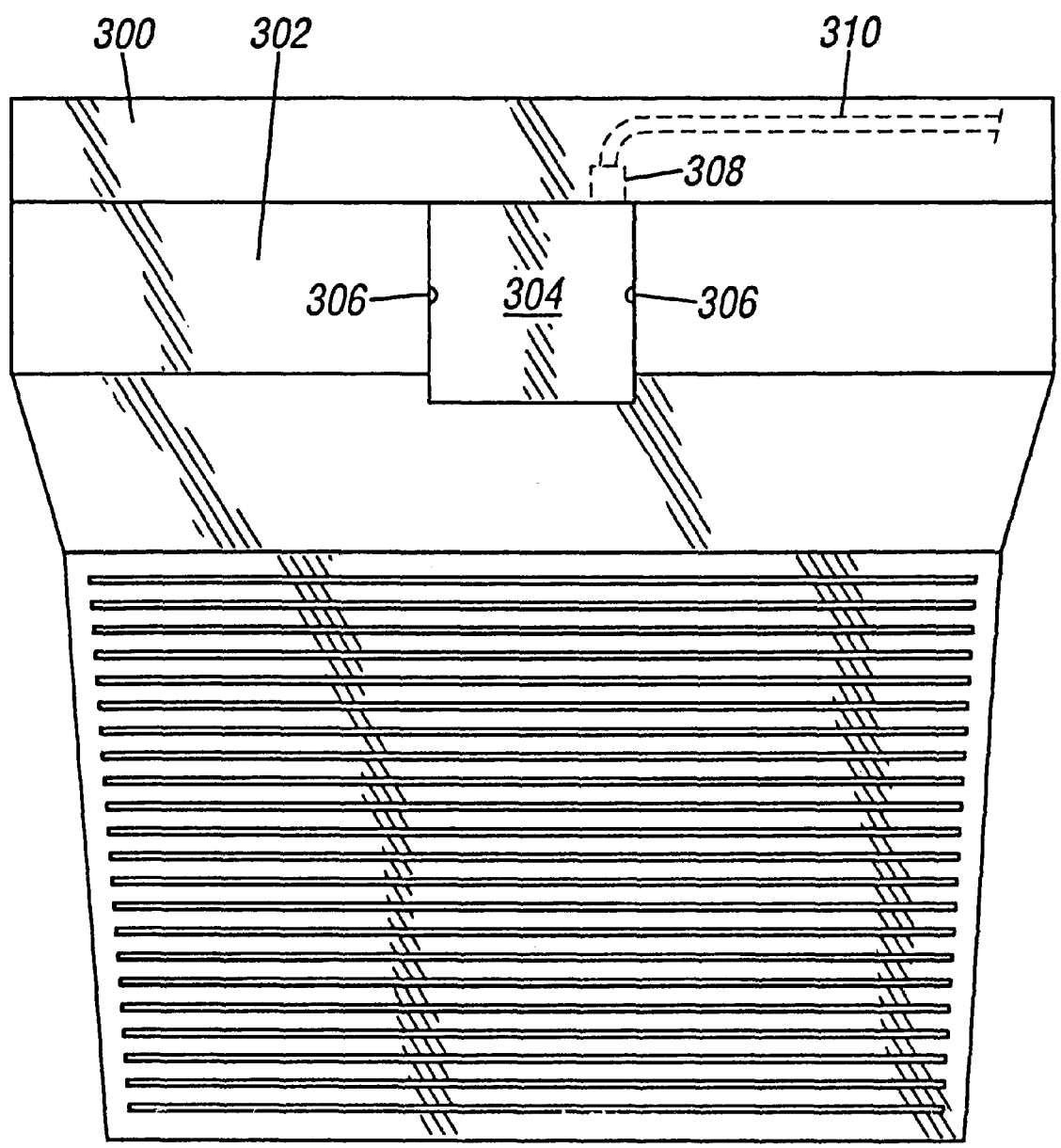

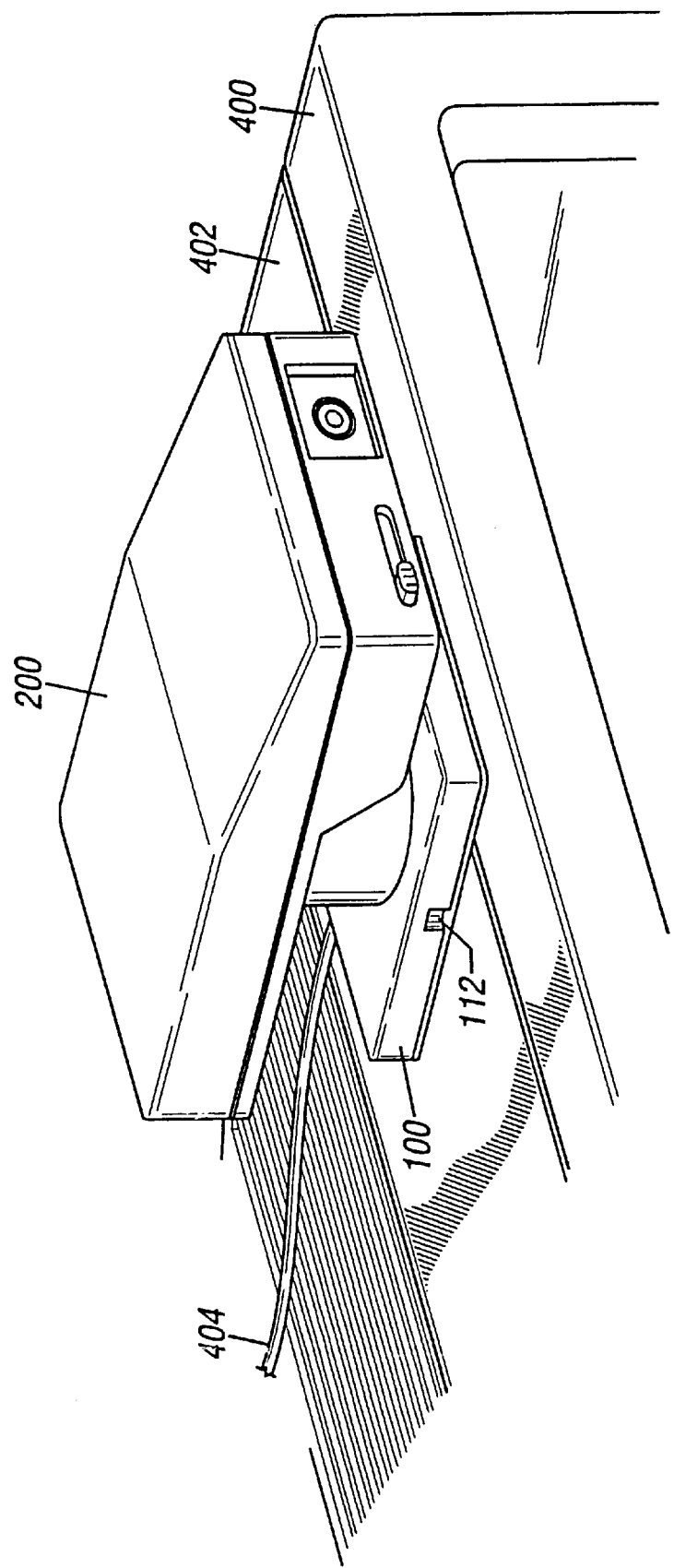

UNIVERSAL MOUNT FOR COMPUTER PERIPHERAL DEVICE

CROSS-REFERENCE TO RELATED APPLICATIONS

Not Applicable.

STATEMENT REGARDING FEDERALLY SPONSORED RESEARCH OR DEVELOPMENT

Not Applicable.

BACKGROUND OF THE INVENTION

1. Field of the Invention

The present invention relates generally to personal computer (PC) systems. More particularly, the present invention relates to a mounting arrangement for a computer peripheral device. Still more particularly, the present invention relates to a computer peripheral device that can be electrically and mechanically attached to the top of a computer monitor without the need for an external cable.

2. Background of the Invention

Various types of input/output devices, such as keyboards for example, can be used to operate a personal computer (PC). In addition to keyboards, PC's can also be controlled by various other input devices such as a mouse, trackball, joystick, or camera. Further, to electrically connect the input/output device to the computer, it is often desirable to physically attach the input/output device to the computer system.

Cameras currently are available for providing snap-shot or video input signals to the computer. Such cameras are controlled by the computer system. Commands, entered via the keyboard or selected from a menu by a mouse, are interpreted by the computer system which then provides electrical signals over a cable to the camera. The electrical signals received by the camera control when the camera takes a picture, as well as other operational aspects of the camera.

It is usually desirable to locate a camera on the top of a computer monitor, thus placing the camera roughly at eye level with the user. Once mounted to the monitor, most cameras can be rotated from left to right and pitched up and down as desired by the user. Cameras often are attached to the top surface of the computer's monitor by way of double-sided tape or Velcro, and a cable electrically connects the camera to the computer system. This arrangement is undesirable for several reasons. First, the cable between the camera and the chassis comprises one more cable in a computer system that may already be inundated with cables. Numerous cables typically are required to provide power to the computer chassis. For example, cables are required to provide power to the monitor, to connect the keyboard to the chassis, to connect a mouse to the chassis, and to provide connection to a network. The mass of cables already required in the computer system tends to cause confusion, is inconvenient, and is aesthetically unappealing. Thus, requiring another cable to connect a camera to the chassis further exacerbates the cable management problem facing the user.

Second, double-sided tape does not allow for easy repositioning of the camera, and tears upon removal. Even if Velcro is used to attach the camera to the monitor, the Velcro portion affixed to the monitor (a second strip of Velcro is affixed to the camera) is normally affixed using an adhesive which again makes repositioning of the camera difficult. Further, over time the tape or Velcro may loosen causing the camera to fall off the top of the monitor.

Third, many camera bases are too large for the top of the monitor where they are usually mounted, and thus protrude past the front edge of the monitor creating an aesthetically unpleasing mounting arrangement. Some monitors, in fact, do not have a top surface that is large and flat enough to allow a camera be securely affixed, forcing the user to find less desirable locations to place the camera.

Fourth, the camera may not be able to tilt through its entire range because there may be insufficient clearance between the camera and the monitor on which the camera is mounted. Finally, mounting a camera to the top surface of a monitor using such techniques as tape or Velco creates an unintegrated appearance and is cumbersome to use.

For these and other reasons, it would be desirable to provide a computer system in which a camera can be mounted to a surface, such as the top surface of the monitor, in such a way to avoid the problems characteristic of previous mounting schemes. Such a mounting arrangement should be easy for the user to use and allow the camera to be securely mounted. Despite the advantages such a mounting scheme would provide, no computer system is available with a mounting scheme for a peripheral device that solves the problems identified above.

SUMMARY OF THE INVENTION

The present invention solves the deficiencies of the prior art by including a computer monitor which mechanically and electrically receives a peripheral device such as a camera. A top surface of the monitor includes a recessed portion into which the peripheral device mounts. A pair of tabs in the recessed portion engage recesses in the peripheral device securely affixing the peripheral device to the monitor. The monitor also includes an electrical connector that automatically mates with a connector on the peripheral device when the peripheral device is mounted in the recessed portion of the monitor, thereby establishing electrical connectivity between the peripheral device and the computer system. This mounting arrangement securely affixes the peripheral device and obviates the need for the user to connect the peripheral to the computer by way of an external cable.

The peripheral device preferably includes a peripheral device mount comprising an electrical and mechanical mounting interface for the monitor. The peripheral device mount allows the peripheral device to rotate in either direction once it is attached to the monitor. The peripheral device mount also includes an electrical cable coupling an electronics assembly in the peripheral device to a connector that mates with a connector in the monitor upon attaching the peripheral device to the monitor. To prevent the peripheral device from rotating more than 360°, and twisting and potentially damaging the electrical cable and its connections inside the peripheral device, the peripheral device includes a pair of tab stops that contact a fixed post when the camera is rotated a predefined angle in either direction.

These and other advantages of the present invention will be apparent to one skilled in the art upon reading the following detailed description of the preferred embodiment.

BRIEF DESCRIPTION OF THE DRAWINGS

FIG. 7 is an exploded view showing the mode of connection of the peripheral device mount of FIG. 1 to a monitor in accordance with a preferred embodiment;

FIG. 8 is a plan view of a monitor in accordance with the preferred embodiment; and FIG. 9 is an isometric view of the peripheral device mount of FIG. 1 with a prior art monitor.

DETAILED DESCRIPTION OF THE PREFERRED EMBODIMENT

Figure 1:
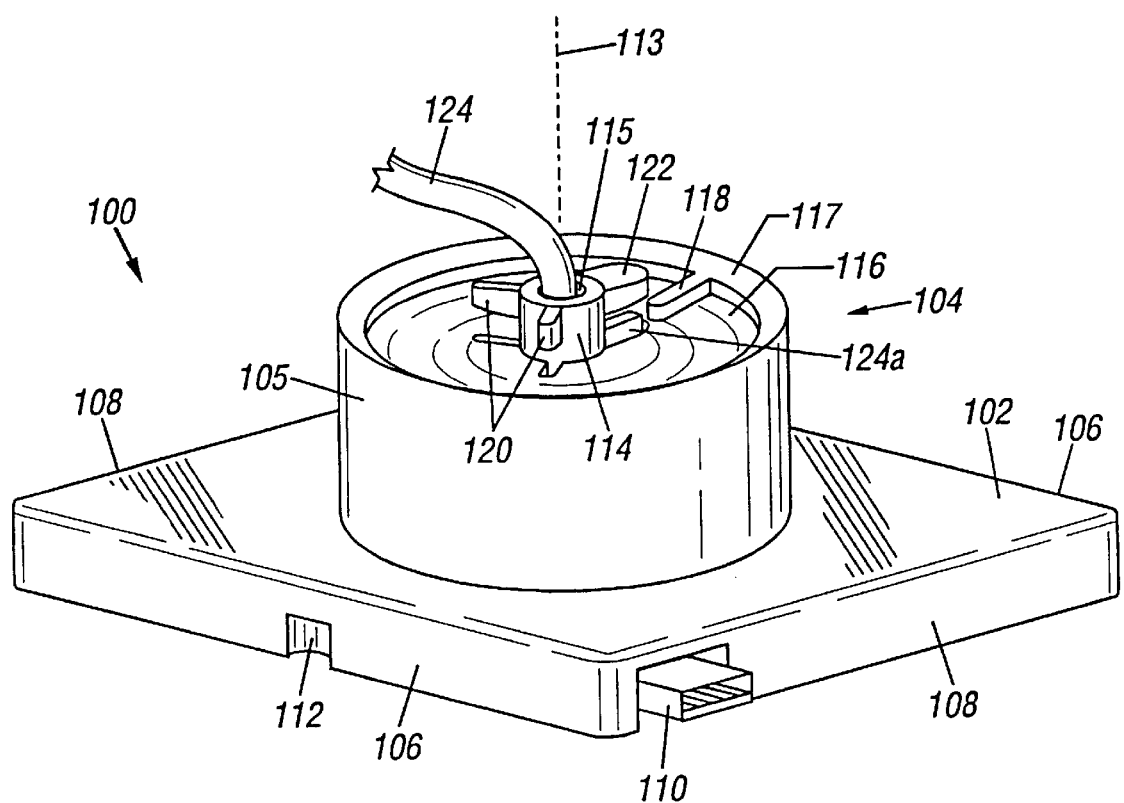
FIG. 1 is an isometric view of a peripheral device mount in accordance with a preferred embodiment.

Referring now to FIG. 1, a peripheral device mount 100 constructed in accordance with the preferred embodiment generally includes a base 102 and interface adapter 104. Base 102 preferably is constructed in a rectangular or square shape with side surfaces 106 and front and rear surfaces 108, although other configurations are possible as described below. An electrical connector 110 protrudes through front surface 108 and provides an electrical connection to the mount 100. Connector 110 may be a universal serial bus (USB) connector or any other connector suitable for the preferred embodiment described below. Both side surfaces 106 include a recess 112, although only one recess 112 is shown in FIG. 1. Base 102 and interface adapter 104 are constructed from plastic or any other suitable durable material.

The interface adapter 104 includes a large cylindrical member 105 mounted or formed in base 102. A small cylindrical member 114 is formed in a top surface 116 of large cylindrical member 105. Small cylindrical member 114 includes a pair of small tabs 120 and a large tab 122. Tabs 120, 122 are bonded to or formed integrally with small cylindrical member 114 and extend radially outward from the center longitudinal axis 113 of cylindrical member 114. An electrical cable 124 passes through a hole 115 in the small cylindrical member 114 and couples to connector 110. Cable 124 includes two or more electrical conductors which are soldered, crimped, or attached using some other suitable method to pins or contacts in connector 110, thereby providing electrical connectivity between cable 124 and connector 110.

Referring still to FIG. 1, a tab 118 protrudes from an outer surface 117 of the large cylindrical member 105 towards the longitudinal axis 113 of the small cylindrical member 114. The purpose of and interaction between the components of the peripheral device mount 100 described above will become apparent from the discussion that follows.

Figure 2:
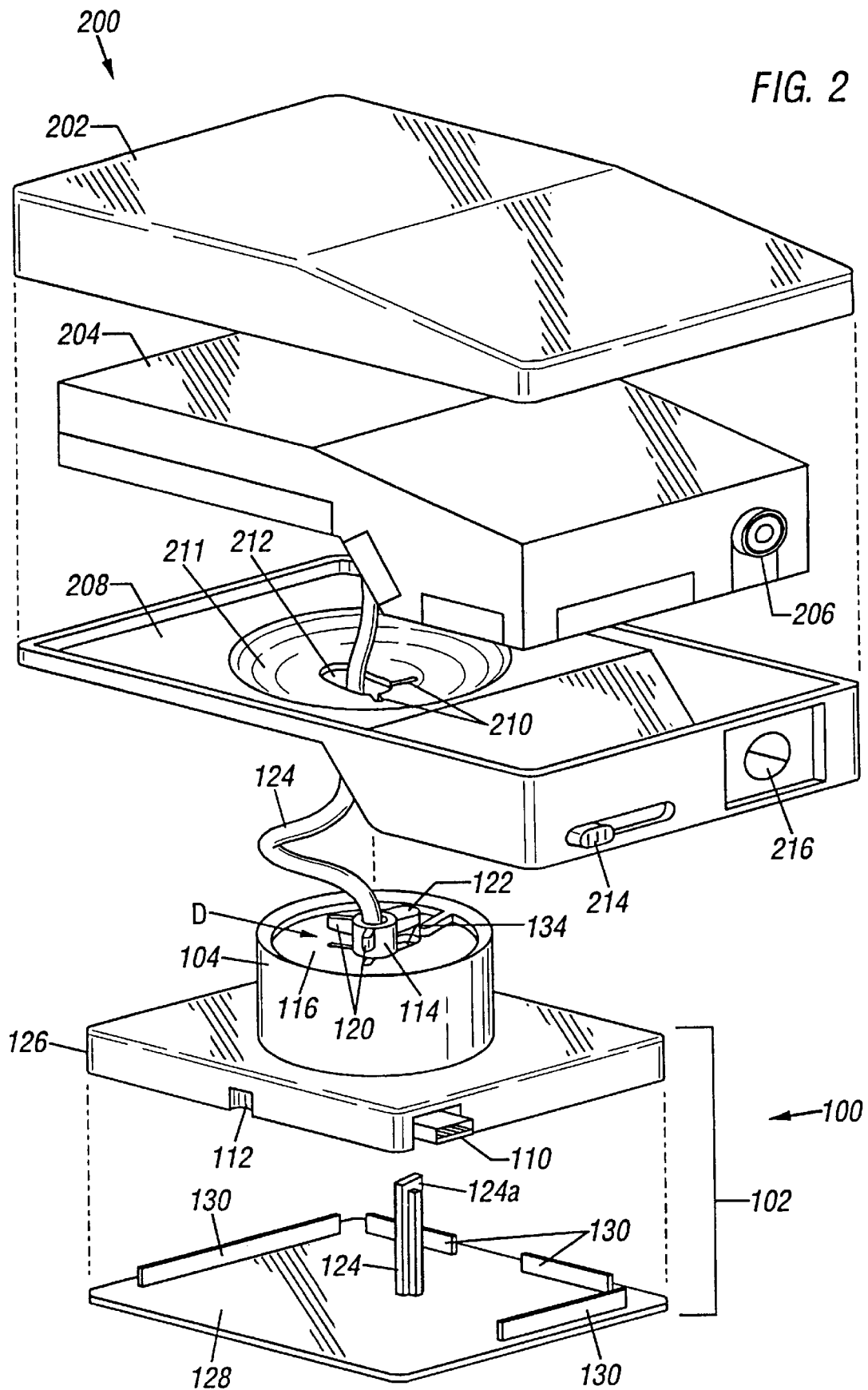
FIG. 2 is an exploded view of the peripheral device mount of FIG. 1 and a camera in accordance with the present invention.

Referring now to FIG. 2, a peripheral device 200 is shown coupled to peripheral device mount 100. Although any peripheral device can be coupled to the peripheral device mount 100 in accordance with the preferred embodiment, the peripheral device is shown as a camera in FIG. 2. As shown, the camera 200 includes an upper housing 202, a lower housing 208, and an electronics assembly 204 disposed between upper housing 202 and lower housing 208. Lower housing 208 includes a lens cover 216 through which light passes to lens 206. Slide control 214 opens and closes lens cover 216.

The peripheral device mount 100 couples to camera 200 via electrical cable 124. As described above, one end of electrical cable 124 couples to connector 110, while the other end of cable 124 connects to the electronics assembly 204, thereby providing electrical connectivity between connector 110 and camera 200. The lower housing 208 of camera 200 includes an orifice 212 through which electrical cable 124 passes between peripheral device mount 100 and electronics assembly 204 in camera 200. Two cut-out slots 210 are located adjacent orifice 112. The shape of the orifice 212 is preferably elongate, and when coupled with cut-out slots 210 matches the size and shape of small cylindrical member 114 and tabs 120 and 122. Accordingly, camera 200 can be coupled to the peripheral device mount 100 by placing the camera over the top of the peripheral device mount 100 such that the small cylindrical member 114 and tabs 120, 122 protrude through orifice 212 and cut-out slots 210. With reference still to FIG. 2, camera 200 would have to be rotated clockwise by 90° from the orientation shown to mate with peripheral device mount 100. Once the camera 200 couples to peripheral device mount 100, the camera can rotate laterally and pitch up and down as desired.

The thickness of the lower housing 208 in the region 211 surrounding the orifice 212 and cut-out slots 210 preferably is less than the distance D between the top surface 116 of the large cylindrical member 105 and the bottom surface of the tabs 120, 122. As such, the lower housing 208, and thus, the entire camera 200, can rotate laterally with respect to the peripheral device mount 100.

Referring still to FIG. 2, the peripheral device mount 100 includes an upper assembly 126 and a base plate 128. Base plate 128 includes alignment tabs 130 to provide proper positioning of upper assembly 126 on the base plate 128. The base plate 128 also includes a post 124 which protrudes through opening 134 in the top of the large cylindrical member 105 when the upper assembly 126 and the base plate 128 are mated. The top portion 124a of the post 124 can be seen in the assembled peripheral device mount 100 in FIG. 1. Base plate 128 mates with upper assembly 126 by friction, screws, or any other suitable fastening methods.

Figure 3:
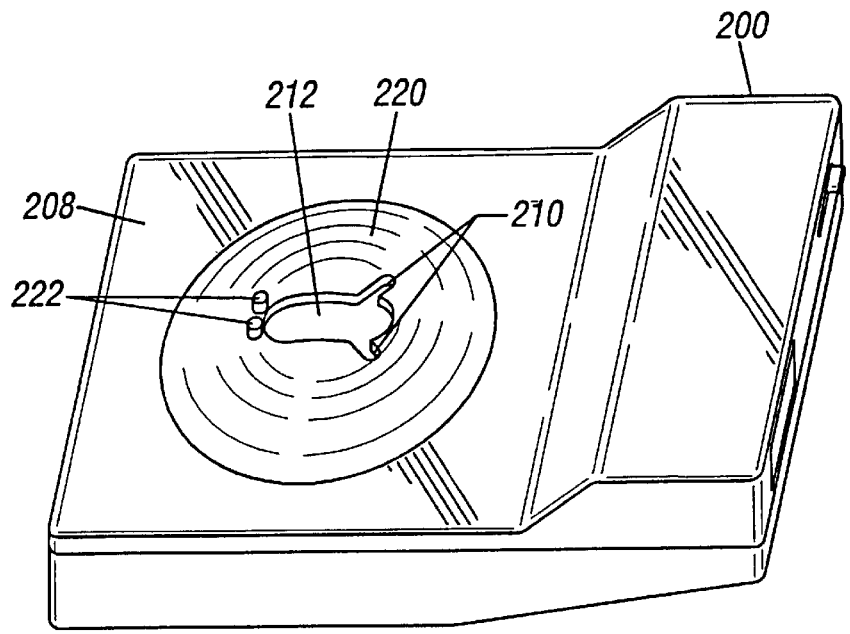
FIG. 3 is a perspective view of the interface surface of the camera of FIG. 2.

The top portion 124a of post 124 which protrudes the rough opening 134 prevents the camera 200 from rotating continuously in one direction. If the camera 200 were allowed to rotate continuously in either direction, electrical cable 124 would become twisted and eventually break loose at its connections to connector 110 or electrical assembly 204 in camera 200. Referring to FIG. 3, the underside of the lower housing 208 of camera 200 includes a curved surface 220 in which orifice 212 is cut out. A pair of small tab stops 222 are located adjacent orifice 212. As described below, the tabs stops 222, in conjunction with the top portion 124a of post 124, prevent camera 200 from rotating freely in either direction.

Figure 4:
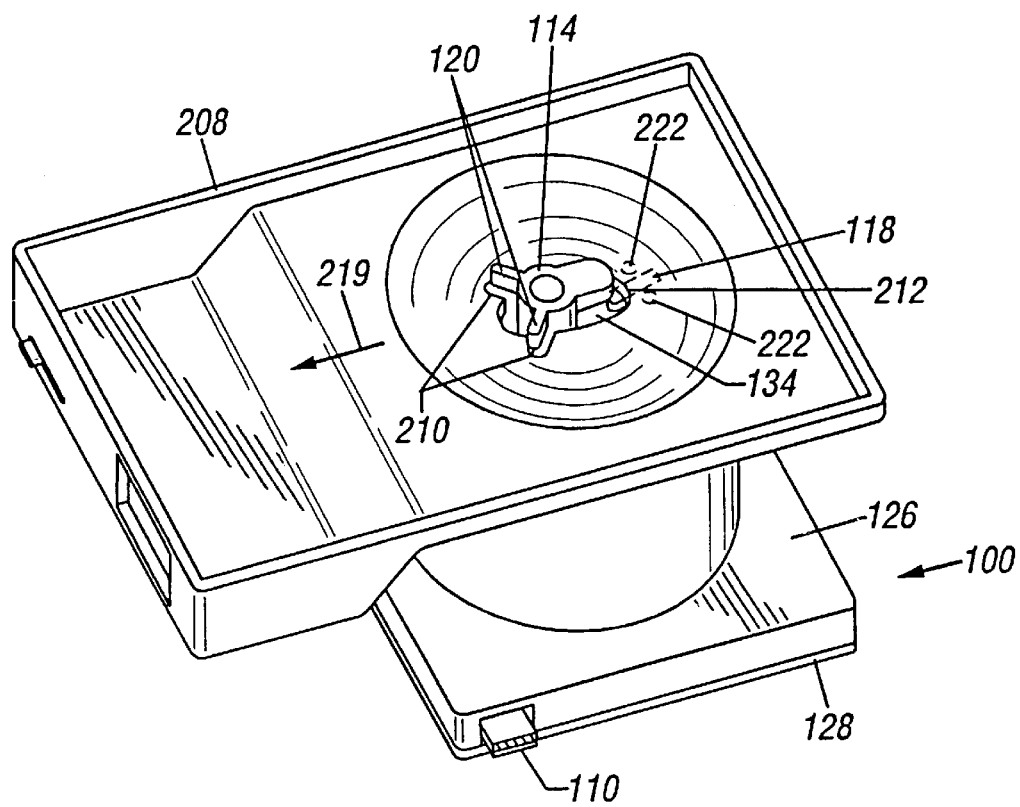
FIG. 4 is a perspective view of a portion of the camera of FIG. 2 partially mated with the peripheral device mount of FIG. 1.
Figure 5:
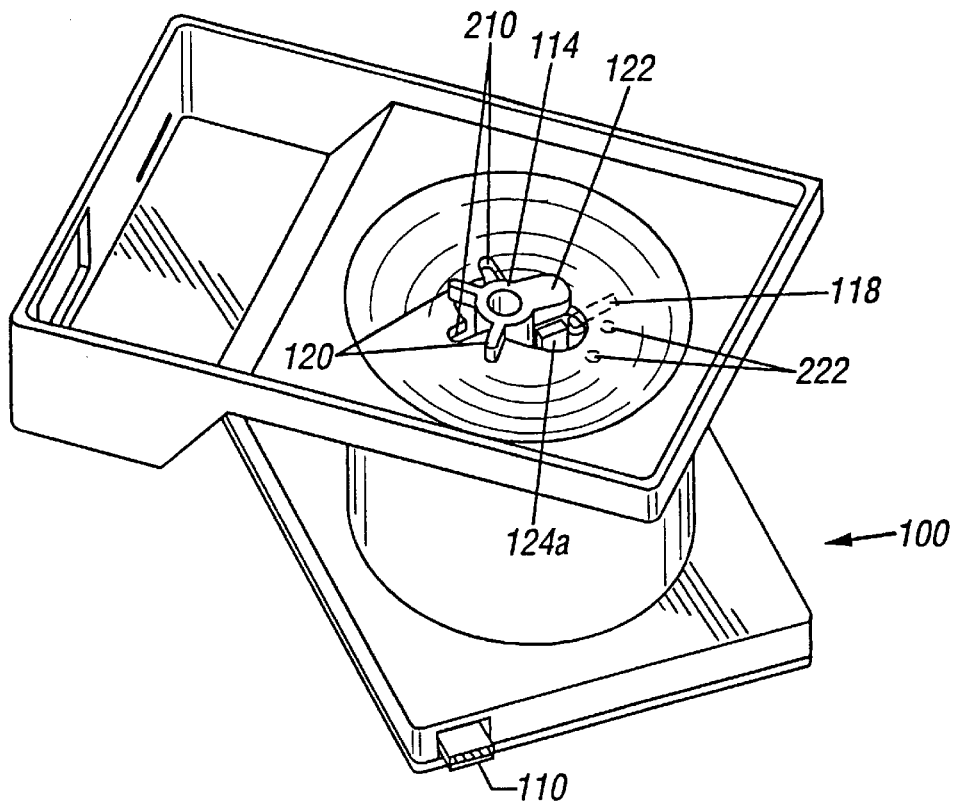
FIG. 5 is a portion of a peripheral device fully mated with the peripheral device mount and rotated with respect to the mount.

Referring now to FIGS. 4 and 5, the assembly of the peripheral device mount 100 and camera 200 is described to explain how the tab stops 222 prevent the camera from rotating unencumbered through 360°. In FIG. 4, the camera 200 (just the lower housing 208 of camera 200 is shown for sale of clarity) is shown oriented so that small cylindrical member 114 and tabs 120, 122 protrude through orifice 212 and cut-outs 210. The lower housing 208 is mated to the upper assembly 126 of peripheral device mount 100 preferably before plate 130 is attached to the upper assembly 126. The reason for mating the lower housing 208 to the upper assembly 126 before plate 130 is attached is that, otherwise, the top portion 124a of post 124 would interfere with the tab stops 222 (FIG. 3) as camera 200 is mated to peripheral device mount 100, and would thus prevent the camera from rotating at all.

Referring now to FIG. 5, once the lower housing 208 is mated to the peripheral device mount 100, the tab stops 222 (shown in outline in FIG. 4 because the tab stops are underneath the lower housing 208) straddle tab 118 on the peripheral device mount. To complete the assembly, the lower housing 208 must be moved relative to the peripheral device mount 100 in the direction of arrow 219 and preferably rotated slightly so that both tab stops are rotated away from tab 118. At this point, the base plate 128 is mated to upper assembly 126 of the peripheral device mount 100 with the top portion 124a of post 124 protruding through opening 134. Top post portion 124a and tab 118 form a substantially contiguous surface upon which tab stops 222 contact if rotated in either direction. Curved surface 220 (FIG. 3) causes the camera to pitch up or down depending on the direction in which the camera is moved. However, regardless of the pitch of the camera, when the camera is rotated, tab stops 222 eventually contact either tab 118 or top post portion 124a preventing further rotation in the same direction. When the camera 200 is rotated in one direction, one of the tab stops 222 contacts the top portion 124a of post 124, thereby preventing the camera from rotation any further in the same direction. When the camera is rotated in the opposite direction, the other of the tab stops 222 contacts the top portion 124a of post 124, thereby preventing further rotation in that direction. The angle through which camera 200 rotates is determined by the spacing between the tab stops 222 as should be recognized by as person of ordinary skill. Preferably, tab stops 222 are spaced so as to prevent camera 200 from rotating by more than 330°.

Figure 6:
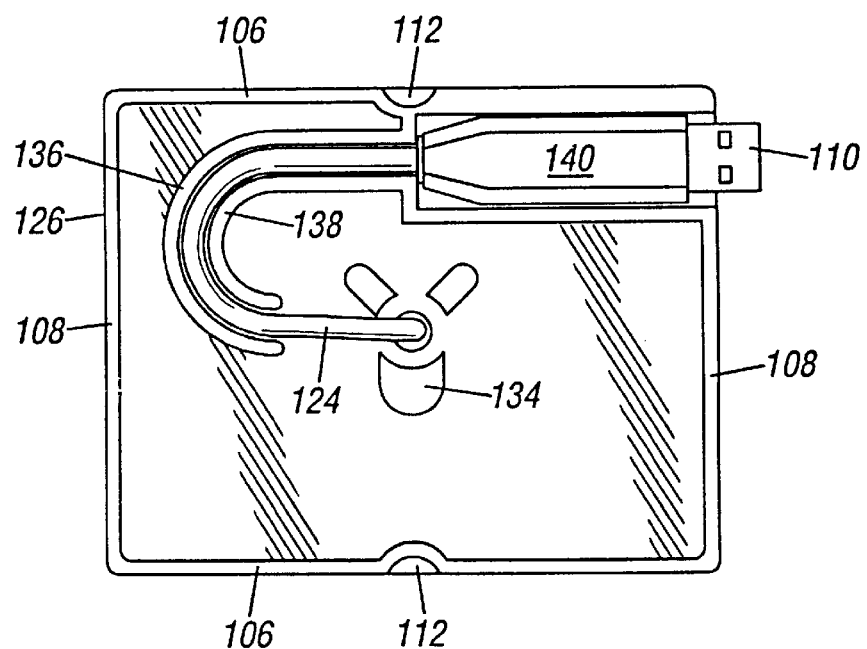
FIG. 6 is a bottom view of a portion of the internal structure of the peripheral device mount of FIG. 1.

Referring now to FIG. 6, the under portion of upper assembly 126 of peripheral device mount 100 includes a pair of curved guides 136 and 138 between which electrical cable 124 passes to connector 110. The upper assembly 126 also includes recesses 112 on opposite side surfaces 106. The recesses 112 preferably are located in middle of side surfaces 106 and are used to affix the peripheral device mount 100 to a computer monitor as described below.

Referring now to FIG. 7, a computer monitor 300 includes a top surface 302. In accordance with the preferred embodiment, upper surface 302 includes a recessed portion 304 that receives peripheral device mount 100. Although only one is shown in FIG. 7, a pair of tabs 306 protrude from either side of recessed 304 and mate with recesses 112 on opposite side of peripheral device mount 100, thereby locking the peripheral device mount to the monitor 300. As such, peripheral device mount 100 and camera 200 are securely affixed to the top of monitor 300. This mounting arrangement provides a much better mounting scheme than double-sided tape or Velcro used in peripheral device mounting schemes of previous computer systems.

Referring to FIGS. 7 and 8, a connector 308 (shown in outline in FIG. 8) is provided in the top of the monitor 300. Connector 308 is a mating connector to connector 110 on peripheral mount 100. Peripheral device mount connector 110 preferably is a male connector and mating connector 308 preferably is a female connector. Both connectors preferably are USB connectors allowing the camera 200 to be attached to the computer system via a USB port according to known convention. A cable 310 connects to connector 308 and is contained inside monitor 300. Monitors generally connect to the computer chassis 305 via a cable 307. The conductors in cable 310, in one embodiment of the invention, are routed into the cable that connects the monitor to the computer chassis. Alternatively, cable 310 is run through the inside of monitor 300 to a connector (not shown) on the rear of the monitor. A separate cable then connects that connector to the computer chassis. Although this latter embodiment requires an extra cable for the user to connect, the cable advantageously is routed between the rear of the monitor 300 and the rear of the computer chassis and out of the way of the user, rather than from a camera taped to the top of a monitor, as is the case for previous cameras.

As peripheral device mount 100 is mated to the top of monitor 300, connectors 110 and 308 automatically mate, thereby providing electrical connectivity between peripheral device mount 100 and monitor 300. Moreover, attaching the combination of camera 200 and peripheral device mount 100 to the top of the monitor 300, not only locks the combination in place, but also allows the camera 200 to be electrically connected to the computer system 300 without the need for the user to attach a separate cable. Once in place, camera 200 can be rotated in either direction as described above and pitched up and down.

Referring now to FIG. 9, the peripheral device mount 100 can also be used with monitors that do not have a cut-out as shown in FIGS. 7 and 8. FIG. 9, for example, shows the peripheral device mount 100 attached to the top of a monitor 400 that does not have a recessed portion. In this case, the peripheral device mount 100 of the preferred embodiment can still be used by rotating the peripheral device mount (with respect to the camera) 180° from the orientation shown in FIG. 7. Connector 110 will then be located at the rear of the camera as shown in FIG. 9. An electrical cable 404 can be used to connect camera 200 to the rear of the computer chassis. In this case, double-sided tape or Velcro may be used to affix the camera 200 to the top of monitor 400. Although this embodiment may exhibit some of the problems discussed previously that are solved by the embodiment shown in FIG. 7, the universal nature of the peripheral device mount 100 is emphasized allowing it to be used with any monitor.

Although the configuration shown are preferred, it should be recognized that many other configurations are possible. For example, recessed portion 304 on the top of monitor 300 in FIG. 7 need not be in the center of the upper surface 302 of the monitor 300. Rather, recessed portion 304 could be to either side of the top surface 302 or on a side surface of monitor 300. Further the peripheral device mount 100 need not be square or rectangular as shown in the Figures, but could be other shapes as desired. It is important, however, that the shape of the recessed portion 304 allow the peripheral device mount to be attached to the top of the monitor.

Numerous variations and modifications will become apparent to those skilled in the art once the above disclosure is fully appreciated. It is intended that the following claims be interpreted to embrace all such variations and modifications.

What is claimed is:

1. A computer system comprising:
    a chassis;
    a monitor coupled to said chassis;
    wherein said monitor includes a top surface, said top surface includes a recessed portion that mechanically receives a peripheral device mount and an electrical connector that engages a corresponding electrical connector in said peripheral device mount.

2. The computer system of claim 1 wherein said recessed portion includes at least one tab for mechanically engaging said peripheral device mount.

3. The computer system of claim 2 wherein said electrical connector in said peripheral device mount and said mating connector in said monitor engage as a result of inserting said peripheral device mount in said recessed portion.

4. The computer system of claim 3 wherein said peripheral device mount is adapted to receive a camera.

5. The computer system of claim 4 wherein said camera includes a lower housing that attaches to said peripheral device mount, said lower housing including a pair of tab stops, and said peripheral device mount including a post against which said tab stops contact preventing further rotation when said camera is rotated to a first position and a second position.

6. The computer system of claim 5 wherein said camera rotates through an angle of approximately 330° between said first and second positions.

7. A peripheral device mount for mounting a peripheral device to a computer monitor, comprising:
   a base plate with a post extending generally upwardly; and
   an upper housing coupled to said base plate, said upper housing including:
      a cylindrical member for receiving said post;
      an electrical connector that engages a mating connector in the computer monitor as the device mount inserts into the monitor; and
      at least one recess in a side surface of said upper housing.

8. The peripheral device mount of claim 7 wherein said upper housing includes three tabs and said peripheral device includes an orifice and a pair of cut-out slots, wherein said tabs engage said orifice and said cut-out slots when said peripheral device is mated to said peripheral device mount.

9. The peripheral device mount of claim 8 further including an electrical cable including a first end and a second end, said first end coupled to said electrical connector and said second end coupled to said peripheral device.

10. The peripheral device mount of claim 9 wherein said electrical cable is disposed with said peripheral device mount.

11. The peripheral device mount of claim 10 wherein said peripheral device includes a lower housing, said lower housing including a pair of tab stops and said peripheral device mount allows said peripheral device to be rotatably coupled to said peripheral device mount, said tab stops contacting said post to prevent continuous rotation.

12. The peripheral device mount of claim 7 wherein said recess engages a tab in said monitor when said peripheral device mount is mounted to a computer monitor.

13. The peripheral device mount of claim 12 wherein said electrical connector mates to a mating connector in said monitor when said peripheral device mount is mounted to a computer monitor.

14. A computer monitor, comprising:
   a top surface;
   a recessed portion in said top surface that receives a peripheral device mount; and
   an electrical connector adjacent said recessed portion that mates with an electrical connector in the peripheral device mount as the peripheral device mount is inserted into said recessed portion.

15. The computer monitor of claim 14 further including at least one tab in said recessed portion for engaging at least one recess in said peripheral device mount.

16. A peripheral computer device, including:
   an electronics assembly; and
   a monitor interface, said monitor interface including an electrical connector and a rotating peripheral device mount, said peripheral device mount including two side surfaces, with each side surface including a recess that receives a projection from a computer monitor, said device mount also including an electrical connector that engages a mating connector built into the computer monitor so that, when mated to the computer monitor, the electrical connections between the device mount and the computer monitor are hidden.

17. The peripheral computer device of claim 16 wherein said peripheral device mounts into a recessed portion in a top surface of a computer monitor and the recessed portion includes the built-in mating connector.

18. The peripheral computer device of claim 17 wherein said peripheral computer device electrically mates with said mating connector as said peripheral device is mounted into said recessed portion.

19. A computer system, comprising:
   a chassis;
   a monitor coupled to said chassis;
   wherein said monitor includes a top surface, said top surface includes a recessed portion that mechanically engages a peripheral device mount and the recessed portion includes at least one tab for mechanically engaging said peripheral device mount, said recessed portion also having an electrical connector that engages a corresponding connector on the peripheral device mount.

20. The computer system of claim 19 further including said peripheral device mount.

21. The computer system of claim 20 wherein said the action of placing the peripheral device mount in the recessed portion causes the electrical connector in the recessed portion to mate automatically with the mating connector on the peripheral device mount.

22. The computer system of claim 20 wherein said peripheral device mount has at least one indentation that receives the at least one tab for mechanically engaging the peripheral device mount.

* * * * *